Patented May 23, 1950

2,508,389

UNITED STATES PATENT OFFICE 2,508,389

METHOD FOR THE PREPARATION OF NEUTRAL ALKYL ESTERS OF PHOSPHORIC ACID

David C. Hull and Jerry R. Snodgrass, Kingsport, Tenn., assignors to Eastman Kodak Company, Rochester, N. Y., a corporation of New Jersey No Drawing. Application February 27, 1947, Serial No. 731,425

14 Claims. (Cl. 260—461)

This invention relates to the preparation of neutral esters of phosphoric acid by the reaction of $P_2O_5$ with an alkyl ether in the presence of an olefin. This application is a continuation in part of our application Serial No. 711,812, filed November 22, 1946.

We have recently shown in our Patent No. 2,407,279, that neutral esters of phosphoric acid may be prepared by the reaction of $P_2O_5$ with diethyl ether at an elevated temperature. The reaction which occurs may be represented by the following formula:

$$3(C_2H_5)_2O + P_2O_5 \rightarrow 2(C_2H_5O)_3PO$$

This reaction involves a considerable lessening of volume at the temperature employed. Consequently, it is desirable to maintain pressure in the vessel in which the reaction is carried out. In our Patent No. 2,407,279, we demonstrated that the use of the ether in large excess was desirable, this being for the purpose of maintaining a suitable pressure for the reaction. We have now found an improvement in this process in that the addition of an olefin, or olefins with other gases to the reaction vessel provides a desirable pressure throughout the reaction and contributes to an increased conversion per batch and a decrease in the amount of residue which is obtained.

One object of our invention is to provide an improved method of making trialkyl phosphates. Another object of our invention is to provide a method for making trialkyl phosphates giving an increased yield over prior methods. A further object of our invention is to provide a method of making trialkyl phosphates using $P_2O_5$ and alkyl ethers. A still further object of our invention is to provide a method of making trialkyl phosphates in which an olefin gaseous at the temperature of the reaction is added to the vessel in which the reaction is carried out. Other objects of our invention will appear herein.

We have found that in the reaction of $P_2O_5$ with an alkyl ether, particularly diethyl ether, some dehydration of the ether occurs. As the usual procedure in preparing trialkyl phosphates in accordance with the method described in our prior patent is of the intermittent batchwise type and the residue obtained in one batch is recycled in a subsequent batch, the dehydration of the ether results in the concentration of free phosphoric acids building up in this residue, and when that concentration becomes too high, the residue is no longer of value for recycling purposes and must be discarded. We have found that the addition of ethylene to the reaction vessel so as to provide pressure therein tends to diminish the dehydration of the ether and also acts to suppress decomposition of the partial phosphate esters which are present in the residue obtained. In addition the ethylene present in the mass has a mass action effect, and, therefore, increases the stability of the reaction mixture. Therefore, instead of free phosphoric acids being formed from partial phosphate esters which might be present, such as diethyl metaphosphate, those esters react with ether to form triethyl phosphate. Also, any tetraethyl pyrophosphates which are formed are protected against decomposition and are converted to triethyl phosphate. The formation of those intermediate products in this reaction and their conversion to triethyl phosphate are taught in our prior Patent No. 2,407,279, and the disclosure of that patent is to be considered as part of the disclosure of this application.

The procedure in accordance with our invention is useful in the preparation of trialkyl phosphates of the alkyls of 2 to 8 carbon atoms, such as triethyl phosphate, tri N-propyl phosphate, tri-isobutyl phosphate, tri N-butyl phosphate, triamyl phosphate, and the like. The process described, however, is particularly useful in the preparation of triethyl phosphate. To prepare those esters the corresponding ethers will be reacted with $P_2O_5$ either with or without catalyst, as desired.

In its broadest aspects our invention involves the mixing together of $P_2O_5$ and the ether in an agitated pressure vessel whereupon the desired amount of olefin is charged to the pressure vessel which is then heated at 65–180° C. Although any percentage of olefin is useful in the process, it is desirable that the proportion of olefin used be at least 3%, based on the weight of the reactants. The preferred amount of olefin to be employed is within the range of 3–20% of the total weight of reactants, although here again higher amounts of olefin may be used although there is no advantage in employing more than 20% of this material. It is also desirable that the temperature of the reaction be kept so as not to exceed 180° C. as much above that temperature decomposition products are formed and also, excessive pressures develop in the reaction vessel. If desired, the olefin may be incorporated in the reaction by using an ether solution thereof or a residue from a previous batch which has been saturated with olefin. The preferred temperature for the carrying out of the reaction is within the range of 140–180° C. The highest yields are obtained when the residue of a previous batch is included in the mixture of the reaction ingredients.

Included within the scope of this invention is not only the reaction of $P_2O_5$ and ether having alkyls of 2–8 carbon atoms but also the reaction of intermediate products, such as dialkyl metaphosphate or tetra alkyl pyrophosphate, or both, with ether to form more trialkyl phosphate than was formed in the process in which these intermediate products were obtained. The reaction in accordance with our invention may be carried out either with or without catalyst, as desired by the individual operator. Some of the catalysts which have been found useful in this reaction are the halogens, boron trifluoride etherate, halogen acids, as well as other esterification catalysts, some of which are listed in our Patent No. 2,407,275. If desired, inert organic solvents may be employed as diluents although it has been found that the reaction goes very well both without diluents and without catalysts, other than than those which are necessary to the invention.

It is desirable in carrying out the reaction of our invention that the ether employed be at least a theoretical amount based on the $P_2O_5$. It is preferable that the ether be used in an amount at least three times the molar amount of $P_2O_5$ or even more, particularly in those cases where an inert solvent is not employed. The amount of ether used, however, need not be as great as that employed in our prior patent in view of the presence of olefin in the reaction vessel. We have found that the reaction in accordance with our invention proceeds very well with the use of 3–5 moles of ether to one mole of $P_2O_5$.

The reaction of our invention is carried out in an enclosed vessel and, therefore, is under pressure. The pressures which are employed are the result of the temperature used and are not critical except that the vessel employed should be gastight so that the pressure generated by the temperature used will be present during the reaction. Ordinarily the olefin is introduced into the autoclave under pressure so that initially the pressure therein is decidedly above atmospheric even before the heating of the vessel takes place.

The following examples illustrate our invention:

*Example 1.*—A stirrer type copper lined autoclave was charged with 2960 g. of diethyl ether and 1420 g. of $P_2O_5$. 280 g. of ethylene were introduced, and the mixture was autoclaved at 170–180° C. for eight hours whereupon the reaction was substantially completed. The ethylene and excess ether which were in gas form were then led off from the autoclave and the ether was condensed, the ethylene being returned to a gas holder. The mass obtained was then distilled at reduced pressure (2–5 mm. of mercury). The distillation was discontinued when the temperature of the base heater had reached 180° C. 2250 g. of triethyl phosphate (62% yield, based on the $P_2O_5$) were obtained and a residue weighing 1400 g. remained.

*Example 2.*—The residue from Example 1 was mixed with 2960 g. of diethyl ether and 1130 g. of $P_2O_5$ in an autoclave. Ethylene was forced into the autoclave until a pressure of 500 p. s. i. was obtained. The mixture was autoclaved at 165° C. for eight hours. The reaction mass obtained was treated as in Example 1 and 2635 g. of triethyl phosphate were obtained. A yield of 89%, based on the $P_2O_5$ was obtained, and the residue remaining weighed 1465 g.

*Example 3.*—2160 g. of diethyl metaphosphate were mixed with 1500 g. of diethyl ether in the autoclave. The pressure in the autoclave was brought up to 500 p. s. i. with ethylene. The mixture was autoclaved at 150–170° C. for ten hours. The ethylene and ether in gaseous form were drawn off and recovered. The reaction mass was vacuum distilled from which was obtained 1402 g. of triethyl phosphate, representing a yield of 75%, based on the diethyl metaphosphate.

*Example 4.*—The procedure described in Example 1 was repeated except that di-isopropyl ether was employed instead of the diethyl ether. The ethylene and ether in gaseous form were drawn off and recovered, and the reaction mass was vacuum distilled to separate the tri-isopropyl phosphate obtained and the residue of partial phosphate esters.

*Example 5.*—4000 parts of di-isopropyl ether and 1420 parts of $P_2O_5$ were mixed together in a stirrer type copper-lined autoclave. The autoclave was charged to 500 p. s. i. with a mixture of crude refinery gas containing methane, 0.6 mol. percent; ethylene, 2.1 mol. percent; ethane, 5.3 mol. percent; propylene, 56.0 mol. percent, and propane, 35.9 mol. percent. The mass was slowly heated to 160–170° C. and autoclaved for eight hours to complete the reaction. The olefin-inert gas and excess ether which were in gas form were led off from the autoclave, and the ether was condensed, the gas being conducted to a gas holder. The mass was then distilled at reduced pressure. 2600 parts of triisopropyl phosphate were obtained.

*Example 6.*—The procedure of the preceding example was repeated except that diethyl ether was employed instead of di-isopropyl ether. The triethyl phosphate obtained was separated from the remainder of the mass by vacuum distillation to obtain a 59% yield.

*Example 7.*—A copper-lined autoclave was charged with 350 parts of diamyl ether, 71 parts of $P_2O_5$ and 40 parts of amylene. The autoclave was heated to 60–70° C. for one hour where the reaction heat carried the temperature to 90° C. The mixture was slowly heated to 160–170° C. and autoclaved for eight hours to complete the reaction. Distillation at reduced pressure gave 205 parts of tri-N-amyl phosphate.

*Example 8.*—The procedure of the preceding example was repeated but using di-2-ethyl hexyl ether and $P_2O_5$ as the reactants. 2-ethyl hexene-1 was used as the olefin. A 38% conversion to tri-2-ethyl hexyl phosphate was obtained.

The trialkyl phosphates obtained in accordance with the process of our invention are of good quality and are useful in the various procedures in which trialkyl phosphates have been employed heretofore as listed in previous disclosures.

In the process in accordance with our invention the olefin which is employed should be gaseous at the temperature at which the reaction occurs, particularly the last portion of the reaction. The choice of olefin to be employed depends upon the temperature conditions to be used and to some extent upon the reactants. Olefins which may be employed in reactions in accordance with our invention, providing, of course, the temperatures are sufficiently high to create pressure in the autoclave are methylene, ethylene, propylene, butylene, amylene, and the like.

We claim:

1. The method of preparing a trialkyl phosphate which comprises reacting phosphorus pentoxide with an ether having only alkyl groups of 2-8 carbon atoms in an enclosed vessel at a temperature of 65-180° C. in an atmosphere of olefin gaseous at the temperature of the reaction, the olefin being at least 3% by weight of the reactants, all for a sufficient time to cause the formation of a substantial proportion of trialkyl phosphate.

2. A method of preparing triethyl phosphate which comprises reacting phosphorus pentoxide with diethyl ether in an enclosed vessel at a temperature of 65-180° C. while contacted with ethylene, the ethylene being at least 3% by weight of the reactants, for a sufficient time to cause the formation of a substantial proportion of triethyl phosphate.

3. A method of preparing triethyl phosphate which comprises reacting phosphorus pentoxide with diethyl ether in an enclosed vessel at a temperature of 65-180° C. while in contact with ethylene, the ethylene being at least 3% by weight of the reactants, for a sufficient time to result in the formation of a substantial amount of triethyl phosphate, followed by separation of the triethyl phosphate from the mass by vacuum distillation.

4. A method of preparing triethyl phosphate which comprises reacting phosphorus pentoxide with diethyl ether in an enclosed vessel at a temperature of 65-180° C. while contacted with ethylene, the ethylene being at least 3% by weight of the reactants, for a sufficient time to give a substantial amount of triethyl phosphate, followed by separation of the triethyl phosphate from the mass by vacuum distillation and mixing the residue therefrom with diethyl ether and again subjecting to a temperature of 65-180° C. while in contact with ethylene to obtain a further amount of triethyl phosphate.

5. A method of preparing triethyl phosphate which comprises reacting phosphorus pentoxide with diethyl ether in an enclosed vessel at a temperature of 140-180° C. while in contact with ethylene, the ethylene being at least 3% by weight of the reactants, for a sufficient time to result in a substantial proportion of triethyl phosphate.

6. A method of preparing triethyl phosphate which comprises reacting an ethyl metaphosphate with diethyl ether in an enclosed vessel at a temperature of 65-180° C. while in contact with ethylene, the ethylene being at least 3% by weight of the reactants, for a sufficient time to cause the formation of a substantial proportion of triethyl phosphate.

7. A method of preparing triethyl phosphate which comprises reacting diethyl ether with tetraethyl pyrophosphate in an enclosed vessel at a temperature of 65-180° C. while in contact with ethylene, the ethylene being at least 3% by weight of the reactants, for a sufficient time to cause the formation of a substantial proportion of triethyl phosphate.

8. A method of preparing triethyl phosphate which comprises reacting phosphorus pentoxide with diethyl ether at a temperature of 65-180° C. in an enclosed vessel also containing an olefin gaseous at the temperature of the reaction, the olefin being at least 3% by weight of the reactants, for a sufficient time to cause the formation of a substantial proportion of triethyl phosphate.

9. A method of preparing triethyl phosphate which comprises reacting phosphorus pentoxide with diethyl ether at a temperature of 65-180° C. in an enclosed vessel containing a substantial proportion of a mixture of olefins and inert gases, the olefin amount being at least 3% by weight of the reactants for a sufficient time to result in the formation of a substantial proportion of triethyl phosphate.

10. A method of preparing a trialkyl phosphate which comprises reacting phosphorus pentoxide with an ether having only alkyl groups of 2-8 carbon atoms in an enclosed vessel at a temperature of 65-180° C. in an atmosphere of ethylene, the ethylene being at least 3% by weight of the reactants, for a sufficient time to cause the formation of a substantial proportion of trialkyl phosphate.

11. A method of preparing a trialkyl phosphate which comprises reacting phosphorus pentoxide with an ether having only alkyl groups of 2-8 carbon atoms in an enclosed vessel at a temperature of 65-180° C. in an atmosphere of amylene, the amylene being at least 3% by weight of the reactants, for a sufficient time to cause the formation of a substantial proportion of trialkyl phosphate.

12. A method of preparing a trialkyl phosphate which comprises reacting a dialkyl metaphosphate with an ether having only alkyl groups of 2-8 carbon atoms in an enclosed vessel at a temperature of 65-180° C. in an atmosphere of an olefin gaseous at the temperature of reaction, the olefin being at least 3% by weight of the reactants, for a sufficient time to cause the formation of a substantial proportion of trialkyl phosphate.

13. A method of preparing a trialkyl phosphate which comprises reacting a tetra alkyl pyrophosphate with an ether having only alkyl groups of 2-8 carbon atoms in an enclosed vessel at a temperature of 65-180° C. in an atmosphere of an olefin gaseous at the temperature of reaction, the olefin being at least 3% by weight of the reactants, for a sufficient time to cause the formation of a substantial proportion of trialkyl phosphate.

14. A method of preparing a trialkyl phosphate which comprises reacting phosphorus pentoxide with an ether having only alkyl groups of 2-8 carbon atoms in an enclosed vessel at a temperature of 65-180° C. in an atmosphere of an olefin, gaseous at the temperature of reaction, the olefin being at least 3% by weight of the reactants, for a sufficient time to result in the formation of a substantial proportion of trialkyl phosphate, followed by separation of the trialkyl phosphate from the mass by vacuum distillation.

DAVID C. HULL.
JERRY RANGE SNODGRASS.

REFERENCES CITED

The following references are of record in the file of this patent:

UNITED STATES PATENTS

| Number | Name | Date |
| --- | --- | --- |
| 2,407,279 | Hull et al. | Sept. 10, 1946 |